2,867,450

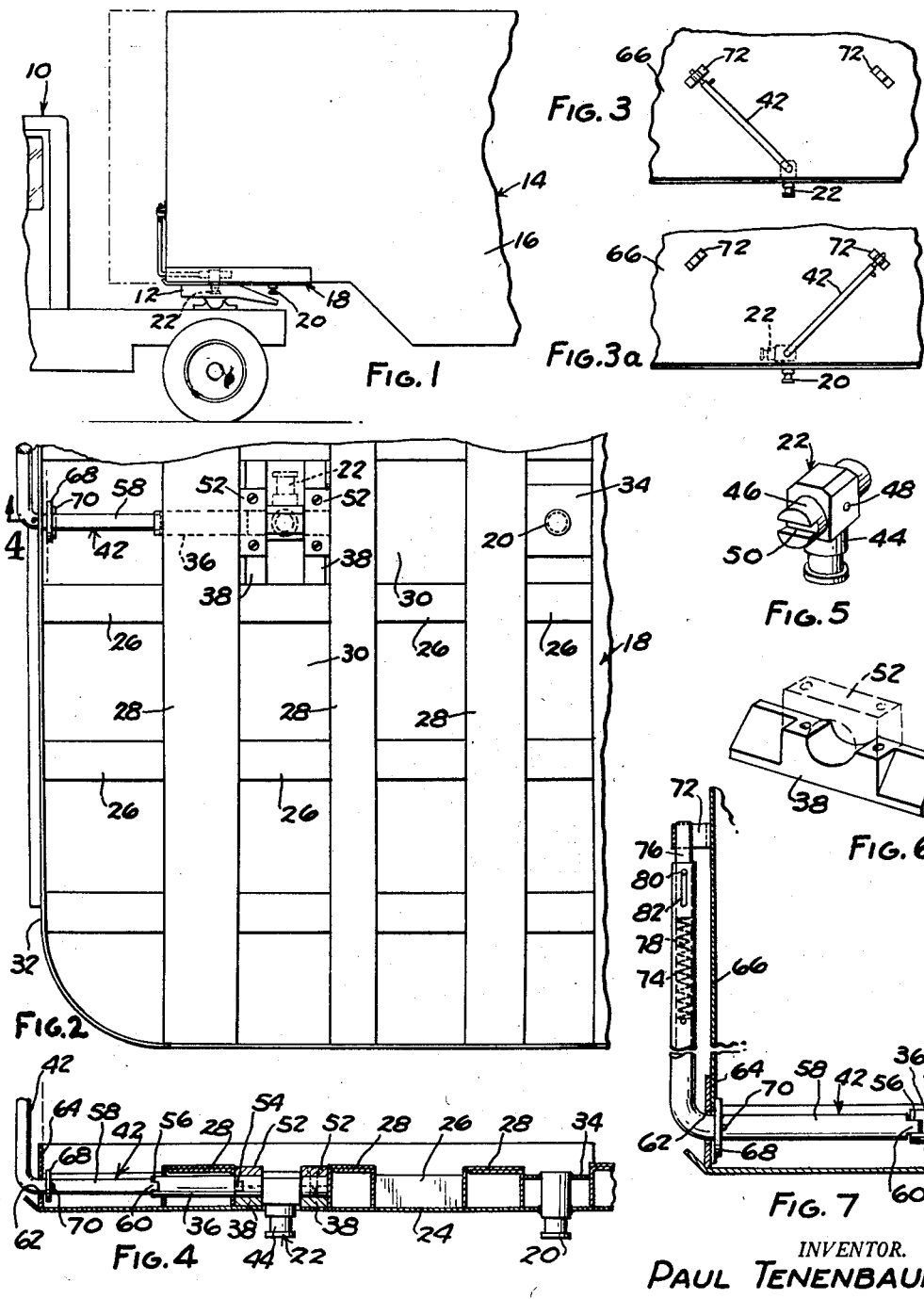

TRAILER KING PIN CONSTRUCTION

Paul Tenenbaum, Oak Park, Mich., assignor to Copco Trailer Division, a division of Copco Steel & Engineering Company, Centerline, Mich., a corporation of Michigan Application February 10, 1958, Serial No. 714,356

6 Claims. (Cl. 280—407)

This invention relates to a trailer king pin construction and more particularly to a construction in which two king pins are arranged for alternative use in combination with a tractor fifth wheel coupling member.

This application is a continuation in part of my earlier application Serial No. 696,558 filed November 14, 1957 now Patent No. 2,831,704 for "Trailer King Pin Construction."

The instant invention provides for a double king pin arrangement in which two pins are spaced apart from each other longitudinally of the trailer at the forward end thereof, the rearward of the two king pins being affixed permanently to the trailer framing and depending in position for engagement with a fifth wheel, the forward of the two pins being rotatably mounted in the trailer framing for movement into fifth wheel engaging position or out of such position, being conjoined to a lever mounted for swinging movement at the forward end of the trailer.

By virtue of this construction, only a single pin is rotatable, so that if the trailer is to be engaged by the rearward king pin, the forward pin is pivoted up into the plane of the framing, out of interference with the fifth wheel. To use the forward pin for engagement with the fifth wheel, it is pivoted downwardly into position below the plane of the trailer framing, by rotation of the lever mounted on the front end of the trailer. The pins are spaced apart from each other a distance sufficient to avoid interference by the rearward fixed pin should the front pin be engaged by the fifth wheel.

The advantages of a dual king pin system provide for using a trailer in narrow city streets as well as on country highways. By using the rearward pin, the swing of the trailer becomes sharper and of lesser radius. This arrangement is better in cities where the streets are narrow and intersections are small. On the highways, the forward king pin engagement provides for a greater radius in turning, which is of assistance there.

The front king pin is pivotally mounted in order to be moved into and out of the path of the fifth wheel with ease. The rear king pin remains fixed, being used when desired.

It is a primary object to the invention to provide a plural king pin construction on a trailer in which a forward king pin is pivotally mounted for engagement with a tractor fifth wheel when required. Another object of the invention is the provision of a rearward king pin fixedly mounted on the trailer framing and spaced longitudinally rearward of the forward king pin a distance sufficient to avoid interference with the tractor fifth wheel when it is engaged with the forward king pin. A further object is to provide a coupling arrangement with the forward king pin whereby it can be pivoted by means mounted on the forward end of the trailer.

These and additional objects of the invention and features of construction will become more readily apparent and understood from the description given below in which the terms are used for purposes of description and not of limitation.

Referring now to the several views of the drawing annexed hereto and forming an integral part of this specification, in which Fig. 1 is a fragmentary side elevational view of a tractor trailer combination at the fifth wheel king pin zone.

Fig. 2 is a fragmentary enlarged plan view of the base plane and framing of the trailer at the front end thereof showing the king pin arrangement and the operating lever for the forward king pin.

Figs. 3 and 3a are fragmentary slightly enlarged front elevational views of the trailer showing the operating lever in alternative positions for pivoting the forward king pin into (Fig. 3) and out of (Fig. 3a) fifth wheel engaging position.

Fig. 4 is a vertical sectional view, on the scale of Fig. 2, taken substantially on the line 4—4 of Fig. 2.

Fig. 5 is a perspective view of the king pin and shaft.

Fig. 6 is a perspective view of one of the pin shaft supports, in the nature of a pillow block.

Fig. 7 is a fragmentary vertical sectional view of the operating lever in engaged position at the forward end of the trailer.

As shown in the several views of the drawing and more particularly in Fig. 1, a trailer hauling tractor 10 is provided with a fifth wheel structure 12 to engage trailer 14 comprising a body 16 having a base structure 18 in which a rearward king pin 20 is fixedly mounted and a forward king pin 22 is rotatably mounted.

The base structure 18 at its forward end comprises a bottom base plate 24 fixedly secured to a number of longitudinally extending channel members 26 and transversely extending channel members 28, whereby spaced pockets or wells 30 are formed by the channel members. Rearwardly of the front end 32 and in one of the wells 30 along a line extending longitudinally medially of the trailer 14, is disposed the king pin 20 fixedly secured by welding to the base plate 24 and, at its upper end, welded to a plate 34 at an opening therethrough. Plate 34 is secured in place by welding to two transverse members 28.

The longitudinally running channel members 26 and the transversely disposed channel members 28 are fixedly secured to each other by welding to form an exceptionally strong grid at the forward end of the trailer 14, whereby to accept the forces generated by the thrust of the fifth wheel 12 upon engagement with either of the king pins.

Forward of the king pin 20 and on the same medial line is the rotatable king pin structure comprising the king pin 22, a coupling shaft 36, pillow blocks 38, and an operating control lever 42.

As shown in Fig. 5, the king pin 22 comprises the depending member 44 and the shaft 46, either integrally formed therewith or separately formed and mounted in fixed position in the upper portion of member 44. When separately fabricated, the shaft 46 is pressed into member 44 and there mounted in place by a pin 48. The preferred method is to integrally form, by casting or forging, the entire king pin 22 with its shaft 46, one end of which is slotted at 50.

The two ends of the shaft 46 are disposed for rotation in pillow blocks 38, which are fixedly secured by welding in one of the wells 30, to the base plate 24 and the framing members 26 and 28. To hold the pin shaft 46 in place, pillow block caps 52 are removably affixed by screws to the blocks 38 over the shaft ends.

Base plate 24 is provided with an opening to pass the depending member 44 of king pin 22 therethrough, for engagement with the fifth wheel structure 12.

As shown clearly in Fig. 4, coupling shaft 36 is rotatably mounted in the framing, and is provided at one end with a key 54 and at the other end with a slot 56. Control operating lever 42 is provided with an element or arm 58 aligned axially with coupling shaft 36 and has its adjacent end arranged with a key 60 adapted to engage shaft 36 in its slot 56. Lever 42 is further arranged to project through an opening 62 in the trailer front edge framing member 64, and is bent at approximately right angles to the arm 58. Framing member 64 is fixedly secured around the front and sides of the body wall 66 at its lower edges. Immediately behind the body wall at the opening 62, a collar 68 is held upon the lever arm 58 by a pin 70, completing the conjunction of the lever 42 to the coupling shaft 36 and the king pin shaft 46.

Of course, it will be understood by persons skilled in the art to which the invention pertains that lever 42, shaft 36 and king pin 22 may be integrally formed, or may be fixedly conjoined for service and operation in the trailer framing without major modification of the construction as here disclosed. It will also be clearly understood that lever 42 and shaft 36 can easily be fabricated as a single unit.

To hold lever 42 in a fixed position during operation of the trailer, whereby king pin 22 is positioned for engagement with a fifth wheel plate or out of engagement therewith in the plane of the trailer framing, a pair of lever keepers 72 are fixedly mounted on the front wall portion of the trailer body wall 66 in positions at either side of the axis of lever arm 58. Lever 42 at its upper exposed end is provided with a bore 74 in which a retractable pin 76 is held against a spring 78. A manually operable pin or key 80 in pin 76 projects through slot 82 in the lever to provide a means of retracting pin 76 prior to insertion in either keeper 72.

The trailer king pin construction of this invention provides that the fixed king pin 20 is positioned sufficiently to the rear of rotatable pivotable king pin 22 so that any interference with the fifth wheel plate structure 12 is avoided when the fifth wheel engages with the forward king pin 22 and the tractor-trailer combination is operated.

To operate the instant device, when the rear fixed king pin 20 is to be engaged with the fifth wheel structure 12, the forward king pin 22 is rotated or pivoted upwardly into the plane of the trailer framing and out of the path which the fifth wheel structure 12 takes in such engagement, by swinging lever 42 from the left side to the right as shown in Fig. 3a. The retractable pin 76 is there engaged in keeper 72, holding king pin 22 horizontally.

When the fifth wheel structure 12 is to engage with the forward king pin 22, lever 42 is pivoted from the right to the left, rotating pin 22 into its depending position. Retractable pin 76 is then secured in the left keeper 72, holding king pin 22 vertically.

It is a preferred construction that each element of the forward rotatable king pin structure be separately removable or disassemblable for easier repair or replacement as the occasion arises, avoiding a major expense in the disassembly of the trailer base framing.

Having described the invention in its simplest terms, it is to be understood that changes and variations in greater or lesser degree may be made in the features of construction here disclosed without departing from the essence of the invention.

I claim:

1. In a trailer king pin construction releasably engageable with a tractor fifth wheel structure, a pair of king pins mounted in a trailer base structure longitudinally thereof in spaced relationship to each other at the forward end of said trailer, the rearward king pin of said pair being fixedly secured in said base structure and depending below the plane of said structure in fifth wheel engaging position, the forward king pin being mounted rotatably in said structure for movement into and out of fifth wheel engaging position, and means conjoined to said forward king pin to rotate said latter king pin selectively into and out of fifth wheel engaging position.

2. In a trailer king pin construction releasably engageable with a tractor fifth wheel structure, a pair of king pins mounted in a trailer base structure along a medial line longitudinally thereof in spaced relationship to each other at the forward end of said trailer, the rearward king pin of said pair being fixedly secured in said base structure, the forward king pin being rotatably mounted in said structure, and means conjoined to said forward king pin to rotate the same selectively into and out of fifth wheel engaging position.

3. The construction defined in claim 2, and in which said pair of king pins are spaced apart from each other a distance sufficient to avoid interference by said rearward king pin with said fifth wheel structure when the latter is engaged with said forward king pin.

4. In a trailer king pin construction releasably engageable with a tractor fifth wheel structure, a pair of king pins mounted in a trailer base structure in spaced relationship to each other longitudinally of and at the forward end of said trailer, the rearward king pin of said pair being fixedly secured in said base structure in fifth wheel engaging position, the forward king pin being rotatably mounted in bearings secured in said base structure, a coupling member removably engageable in conjunction with said rotatable king pin and means conjoined to said coupling member to rotate said forward king pin selectively into and out of fifth wheel engaging position.

5. The construction defined in claim 4, and in which said means comprises an arm removably engageable in conjunction with said coupling member and a lever element substantially at right angles to said arm for pivoting swinging to selected positions, whereby said forward king pin is rotated in a corresponding direction upon pivoting of said lever element.

6. The construction defined in claim 5, and in which keeper means are mounted on said trailer in selected positions to engage and retain said lever element, whereby said forward king pin is held alternatively and selectively in fifth wheel engaging position and out of fifth wheel engaging position.

References Cited in the file of this patent

UNITED STATES PATENTS

| 2,494,799 | Duvall et al. | Jan. 17, 1950 |
| 2,773,701 | Safko | Dec. 11, 1956 |
| 2,831,704 | Tenenbaum | Apr. 22, 1958 |
| 2,838,324 | Dalton | June 10, 1958 |

FOREIGN PATENTS

| 164,265 | Germany | Oct. 23, 1905 |